United States Patent [19]

Bito et al.

[11] Patent Number: 5,229,226
[45] Date of Patent: Jul. 20, 1993

[54] NONAQUEOUS ELECTROLYTE SECONDARY BATTERY WITH BORON TRICARBIDE OR PENTACARBON NITRIDE AS ANODE

[75] Inventors: Yasuhiko Bito, Yao; Hiroyuki Murai, both of Hirakata; Masaki Hasegawa; Shuji Ito, Kadoma, all of Japan

[73] Assignee: Matsushita Electric Industrial Co., Ltd., Kudoma, Japan

[21] Appl. No.: 899,092

[22] Filed: Jun. 15, 1992

Related U.S. Application Data

[63] Continuation of Ser. No. 823,210, Jan. 21, 1992, abandoned.

[30] Foreign Application Priority Data

Jan. 21, 1991 [JP] Japan ........................ 3-5037

[51] Int. Cl.$^5$ .................... H01M 6/16; H01M 4/58; H01M 4/60
[52] U.S. Cl. ................................. 429/194; 429/197; 429/213; 429/218
[58] Field of Search ............... 429/194, 197, 213, 218

[56] References Cited

FOREIGN PATENT DOCUMENTS 3165463 7/1991 Japan .

OTHER PUBLICATIONS

J. Kouvetakis, R. B. Kaner, M. L. Sattler and N. Bartlett, "A Novel Graphite-Like Material of Composition $BC_3$, and Nitrogen-Carbon Graphites", in *J. Chem. Soc., Chem. Commun.*, p. 1758 (1986).
T. Sasaki and Y. Fujiki, "Novel Graphite Relatives of 2 or 3 Constituent Elements of Boron, Carbon and Nitrogen", in *Gypsum & Lime* No. 219, p. 45 (1989).

*Primary Examiner*—John S. Maples
*Attorney, Agent, or Firm*—Ratner & Prestia

[57] ABSTRACT

A nonaqueous electrolyte secondary battery is disclosed which has a positive and negative electrode and electrolyte, the positive and negative electrode being reversible for charging and discharging, the electrolyte being a nonaqueous one containing alkaline metal ions, and the negative electrode being made of $BC_3$ or $C_5N$, so that the battery is of high energy density and is highly reliable with reasonable voltage.

7 Claims, 5 Drawing Sheets

NONAQUEOUS ELECTROLYTE SECONDARY BATTERY WITH BORON TRICARBIDE OR PENTACARBON NITRIDE AS ANODE

This application is a continuation of application Ser. No. 07/823,210 filed Jan. 21, 1992, now abandoned.

BACKGROUND OF THE INVENTION

1. Field of the Invention

This invention relates to a nonaqueous electrolyte secondary battery, particularly being highly reliable, and having an improved negative electrode, high energy density, large capacity, and not suffering from short circuiting due to growing of dendrite.

2. Description of the Prior Art

Nonaqueous electrolyte secondary batteries provided with negative electrodes of alkaline metal such as lithium(Li) or sodium(Na) have high electromotive force and are expected to realize higher energy density compared with conventional nickel-cadmium or lead batteries. Nonaqueous electrolyte secondary batteries, in particular having negative electrodes of lithium, have been investigated.

However, batteries with metal alkaline as the negative electrode experience dendrite growth while being charged. This often results in short circuiting and low reliability.

. In order to solve this problem, a negative electrode of alloy consisting of Li and aluminum(Al) and lead(Pb) has been investigated. With this negative electrode of alloy, Li is occluded in this negative alloy-electrode while charging, and dendrite does not grow, thus resulting in a highly reliable battery. However, because the discharging potential of this negative alloy-electrode has a potential which is about 0.5 V higher than the metal Li, the voltage of the battery decreases 0.5 V. Accordingly, the energy density of the battery is also lowered.

On the other hand, application of an intercalation compound (e.g. graphite) between Li and carbon(C) as the active material of the negative electrode has been investigated. In this case, too, dendrite does not grow as a result of charging, since Li goes into the parts between the carbon layers. The negative electrode, with the discharging potential about 0.1 V, which has a higher potential than metal Li and a small decrease of the battery voltage, is a desirable one. However, it still has a serious problem. The penetration of Li into the interlayer part is limited, theoretically, to the quantity decided by formula $C_6Li$ at the maximum, or a discharge capacity of 372 Ah/kg. For the actual batteries, the electric capacity for charging and discharging is as small as 230 Ah/kg.

Also, an electrode material consisting of BCN(H) has been proposed (Japanese Patent Gazette No. Toku.-Kai.Hei 3-165463), in which a uniform compound consisting of elements B, C and N and/or those added with hydrogen is used as an electrode material. Of this BCN(H), the discharging potential has a potential about 0.5 V higher than that of metal Li, and the discharging electric quantity for unit active material of the negative electrode is as small as 100 mAh/g.

SUMMARY OF THE INVENTION

It is an object of the present invention to provide a nonaqueous electrolyte secondary battery which involves alkaline metal ion and has large electric capacity and high energy-density, and whose discharging potential is only about 0.1 V lower compared with batteries having a lithium electrode.

It is another object of the present invention to provide a nonaqueous electrolyte secondary battery, in which alkaline metal does not precipitate as elemental metal, and short circuiting as a result of dendrite growth does not occur.

In order to attain the above objects, the nonaqueous electrolyte secondary battery according to the present invention comprises a positive electrode and a negative electrode, and a nonaqueous electrolyte containing alkaline metal ions, in which the said negative electrode is formed by at least one selected from the group of borontricarbide($BC_3$) and pentacarbonnitride($C_5N$) containing alkaline metal under charged state, and the said alkaline metal is at least one of lithium and sodium.

DETAILED DESCRIPTION OF THE INVENTION

Example 1

Initial discussion will focus on $BC_3$.

The electric conductivity of $BC_3$ is about 10% higher than that of graphite, and a negative electrode made of $BC_3$ does not need conducting material. The specific gravity of $BC_3$ is 2.2, which is nearly the same as that of graphite.

An atom of boron which constitutes $BC_3$ has two electrons on a 2S orbit and one electron on a 2P orbit, while that of carbon has two electrons on a 2S orbit and two electrons on a 2P orbit. Thus, $BC_3$ has electrons which is one fewer electron than C.

It was found that, when a $BC_3$ negative electrode is charged in a nonaqueous electrolyte containing ions of alkaline metal such as Li or Na, the alkaline metal is occluded in the negative electrode, and, when the electrode is discharged, the occluded alkaline metal is released into the electrolyte, in like manner as for the conventional C electrode.

Therefore, the alkaline metal is not precipitated as elemental metal by charging and short circuiting by dendrite does not occur.

It is considered that the alkaline metal involved in $BC_3$ by charging is ionized, and by supplying electrons to B which is short of electrons, alkaline metal and $BC_3$ form a stable compound. Accordingly, $BC_3$ alkaline metal is theoretically contained at the rate of 1 mol alkaline metal/mol $BC_3$, resulting in a negative electrode for which a capacity as large as 570 Ah/kg is expected.

Figure 1:
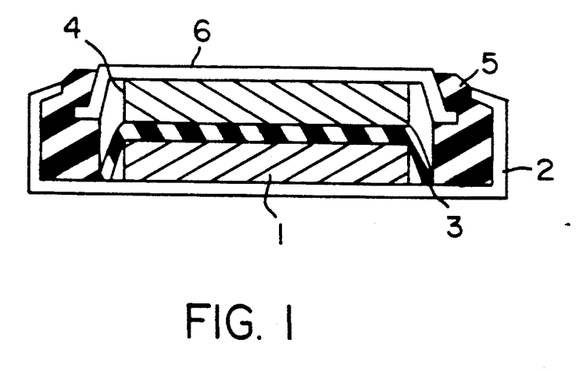
FIG. 1 is a section of a trial battery to evaluate a $BC_3$ or $C_5N$ electrode according to the present invention.

To investigate the characteristics of $BC_3$ as an electrode, a trial battery as shown in FIG. 1 was fabricated.

Ten grams of $BC_3$ were added and mixed with 1 g of polyethylene powder as a binder to produce a mixture. $BC_3$ electrode 1 of 17.5 mm diameter was formed with 0.1 g of this mixture by pressing, and was laid in a case 2.

A microporous polypropylene separator 3 was put on the $BC_3$ electrode 1. A polypropylene carbonate(PC) containing 1 mol lithium perchlorate($LiClO_4$) per liter was prepared, and a mixed solution of the above PC and dimethoxyetane(DME) of 1:1 mixing ratio was prepared and poured onto the separator as the nonaqueous electrolyte. Thereon, further, a cover 6, which is provided with metal Li 4 of 17.5 mm diameter on the inside and a polypropylene gasket 5 on the periphery, was laid to seal and form the trial battery.

The trial battery was applied with cathode polarization. If the $BC_3$ electrode is considered a negative electrode, this corresponds to charging. Cathode polarization was applied with a constant current of 2 mA until the $BC_3$ electrode became 0 V with reference to the opposite electrode of Li. Anode polarization is then applied (corresponding to discharging) until the $BC_3$ electrode becomes 1.0 V. Cathode polarization and anode polarization were repeatedly applied.

A conventional battery was prepared in like manner, but with a carbon electrode of natural graphite, to be applied with cathode and anode polarization.

Figure 2:
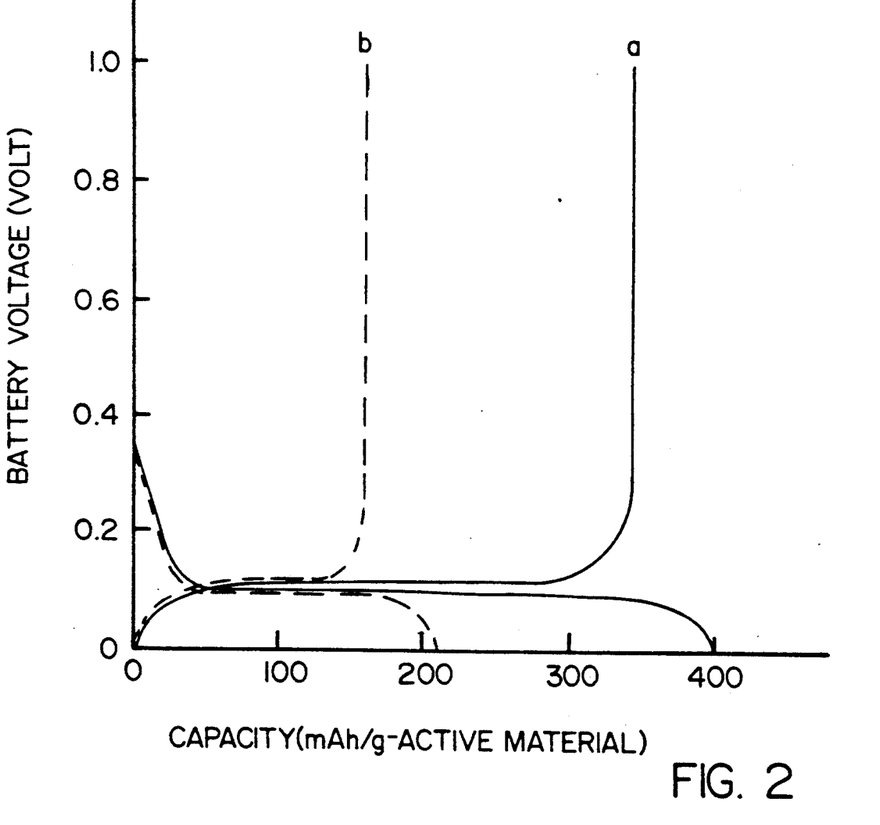
FIG. 2 shows curves of cathode polarization and anode polarization of the $BC_3$ electrode of the present invention.

For the $BC_3$ electrode and C electrode, a cathode polarization curve and an anode polarization curve at the 10th cycle are shown in FIG. 2. The result of $BC_3$ electrode was designated a, and that of C electrode b. The voltages at the polarization are nearly the same for the $BC_3$ electrode and C electrode, while the capacity was larger for the $BC_3$ electrode of the present embodiment. After the cathode polarization of the 11th cycle, the trial battery was disassembled. For both the $BC_3$ and C electrodes no deposition of metal Li was found. For the $BC_3$ electrode, the Li was occluded in the electrode by the cathode polarization.

Thus, for the $BC_3$ electrode, it was found that Li is occluded in the electrode by the cathode polarization and the occluded Li is released by the anode polarization, and that the metal Li is not deposited. It was also found that the voltage at the anode polarization is the same as that of the C electrode while the electric capacity at the anode polarization is extremely larger than that of the C electrode.

Example 2

Figure 3:
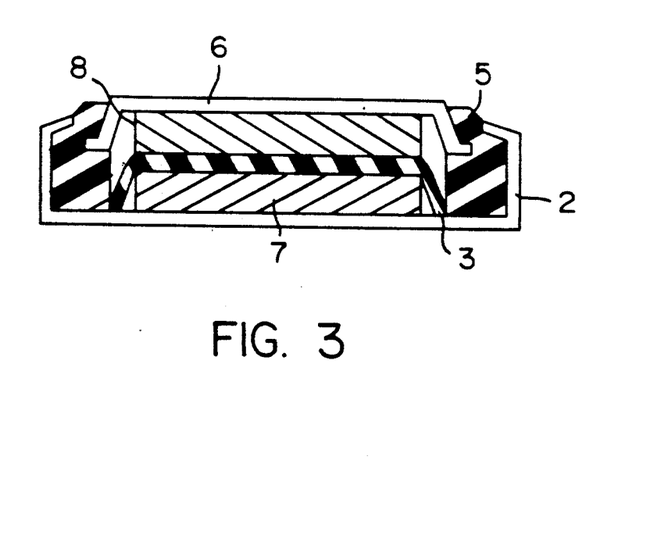
FIG. 3 is a section of a coin-type battery with a negative electrode of $BC_3$ according to the invention.

A coin-type battery with a negative electrode of $BC_3$ as shown in FIG. 3 was made for investigation of its characteristics.

As the positive active material which is reversible for charging and discharging, $LiMn_2O_4$ was applied. One hundred grams of the positive active material was added with 7 g of acetylene black as the conducting agent and 7 g of polytetrafluoroethylene as the binder, and mixed to form a positive electrode mixture.

A positive electrode 7 of 17.5 mm diameter was formed by pressing 1 g of the above positive electrode mixture and was placed in a case 2.

On the positive electrode 7 a microporous polypropylene separator 3 was placed. Lithium trifluoromethanesulfonide ($LiCF_3SO_3$) was dissolved in PC by the ratio of 1 mol/l to form the nonaqueous electrolyte.

The negative electrode mixture was prepared by mixing 10 g of $BC_3$ and 1 g of polyethylene powder as the binder, and negative electrode 8 of 17.5 mm diameter was formed by pressing 0.1 g of the mixture. The nonaqueous electrolyte was poured onto the separator 3 and thereupon was laid a negative electrode 8.

Further thereupon a cover 6 having a polypropylene gasket 5 was laid to seal and finish the battery.

A conventional battery was prepared with a negative electrode 7 of natural graphite and, of the other elements, with the same constitution as for the cell of $BC_3$. The battery having C negative electrode was designated c, and that having $BC_3$ negative electrode d. For both the batteries, capacities of the positive electrode were larger, and the battery capacities depend on the capacities of the negative electrodes.

Figure 4:
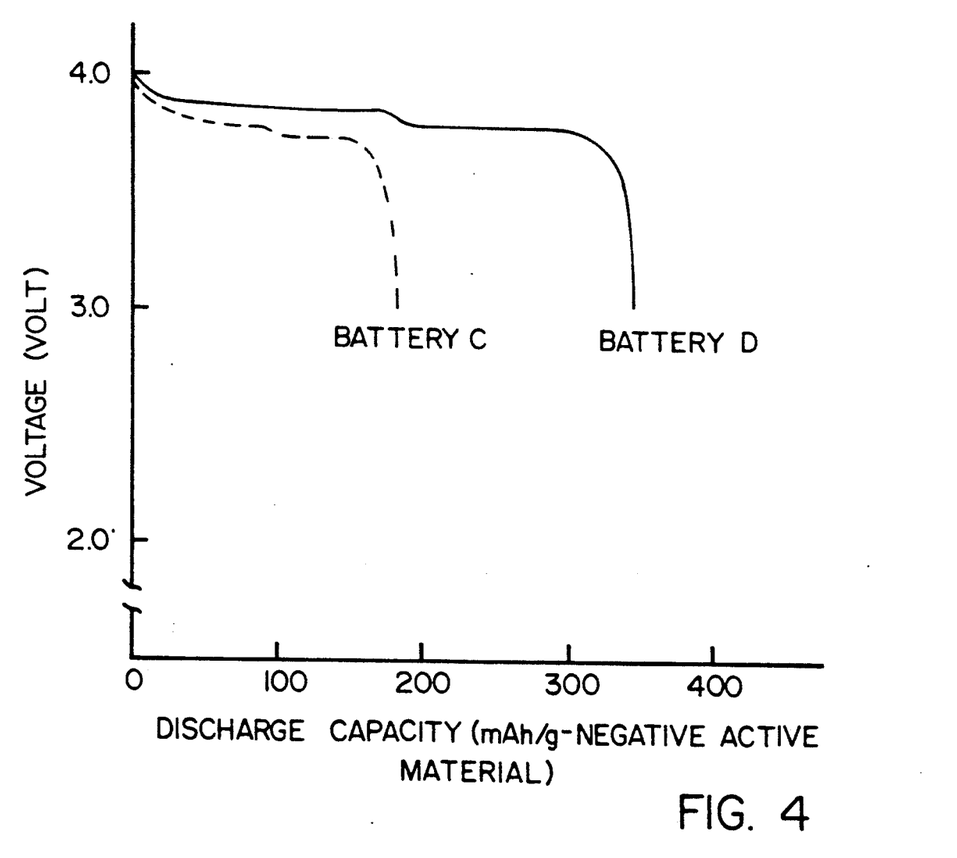
FIG. 4 shows a discharging curve of a coin-type battery with a negative electrode of $BC_3$, of which the alkaline metal involved by charging is lithium.

The batteries were charged with constant current of 2 mA, up to 4.4 V. The batteries were then discharged down to 3 V. This charging and discharging were repeated. FIG. 4 shows the discharging curves of the 10th cycle. The discharging voltages are the same for c and d, while the capacity is extremely large for d.

After the 50th charging, both batteries were disassembled and inspected on the deposition of metal Li, without being recognized for both.

Further to the above described $LiMn_2O_4$ as the positive active material, the $BC_3$ negative electrode can, of course, have similar results if combined with any other positive active material such as $LiCoO_2$ or $LiNiO_2$ which has reversibility for charging and discharging.

Example 3

Instead of using Li as the alkaline metal involved in the negative electrode by charging in Example 1 or 2, Na is examined in this example. For this example, $NaNiO_2$ was used as the positive active material and γ-butyrolactone involving sodium perchlorate ($NaClO_4$) dissolved at a rate of 1 mol/l therein was adapted as the nonaqueous electrolyte. Other conditions are the same as those of the Example 2.

A battery having a C negative electrode was designated e, and that provided with $BC_3$ negative electrode was named f. Both batteries had a positive electrode of large capacity, so that the capacities of the batteries were determined by those of the negative electrodes.

Figure 5:
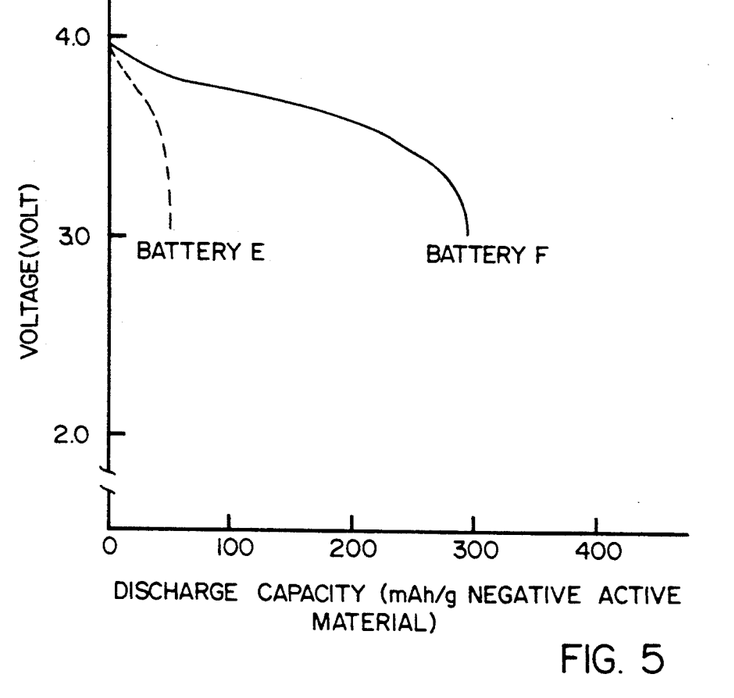
FIG. 5 shows discharging curves of the coin-type batteries with a negative electrode of $BC_3$, of which the alkaline metal involved by charging is sodium.

The batteries were charged with a constant 2 mA current, up to 4.0 V and then discharged down to 3.0 V. The charging and discharging were repeated. In FIG. 5, discharging curves of the 10th cycle are given. While the discharging voltages are the same for e and f, the capacity is extremely large for f.

After the 50th charging, the batteries were disassembled and inspected on the deposition of metal Li, without being recognized on both.

Example 4

Nitrogen which constitutes $C_5N$ has 2 electrons on the 2S orbit and 3 electrons on the 2P orbit, while carbon has 2 electrons on the 2S orbit and 2 electrons on the 2P orbit. Thus, $C_5N$ has one more electron than C.

The state of these electrons is considered to be the reason that $C_5N$ has high electric conductivity without intercalation and $C_5N$ is also stable in keeping this high conductivity.

It was found that if the $C_5N$ negative electrode is charged in a nonaqueous electrolyte containing alkaline metal ions such as Li or Na, alkaline metal is occluded in the negative electrode, and, if the electrode is discharged, the occluded alkaline metal is released as ions in the electrolyte, in like manner as in the case of the conventional C negative electrode. Accordingly, by charging, neither deposition of alkaline metal at metal state nor short circuiting by dendrite occurs. It is considered that the alkaline metal ions involved in $C_5N$ by charging is supplied with electrons by N which has superfluous electrons, to form, with $C_5N$, a stable compound. Therefore, it is considered further that one mol alkaline metal is contained in one mol $C_5N$ and theoretical maximum capacity is 362 Ah/kg.

Although this value is not much different from the theoretical maximum value for graphite 372 Ah/kg, $C_5N$ is considered, at the discharged state when alkaline metal is not involved, to be in a state of electrons easily to take in cations of alkaline metal and electrochemically in active state, so that it is expected to become an excellent negative electrode having large capacity close to the theoretical value.

To examine the characteristics of $C_5N$ as an electrode, a trial battery as shown in FIG. 1 was made. Ten grams of $C_5N$ were mixed with 1 g of polyethylene powder as a binder to form a mixture.

$C_5N$ electrode 1 of 17.5 mm diameter was made by pressing 0.1 g of the mixture, and was laid in a case 2. A microporous polypropylene separator 3 was placed on the $C_5N$ electrode 1. A mixed solution of 1:1 volume ratio of polypropylene carbonate(PC) containing lithium perchlorate($LiClO_4$) dissolved therein by the ratio of 1 mol/l and dimethoxyethane(DME) was, as the nonaqueous electrolyte, poured onto the separator 3. Thereupon, a cover 6 was provided on the inside with metal Li 4 of 17.5 mm diameter. On the periphery, a polypropylene gasket 5 was placed to seal and to finish the trial battery.

The battery was applied with cathode polarization. This corresponds to charging, if the $C_5N$ electrode is considered to be negative electrode. The cathode polarization was applied with a constant 2 mA current until the voltage of $C_5N$ electrode against the counter Li-electrode became 0 V. Then, the battery was applied with anode polarization (corresponding to discharging) until the voltage of $C_5N$ became 1.0 V. These cathode and anode polarizations were repeatedly made.

A conventional battery was prepared with a C electrode of natural graphite and was applied with repeated cathode and anode polarization.

Figure 6:
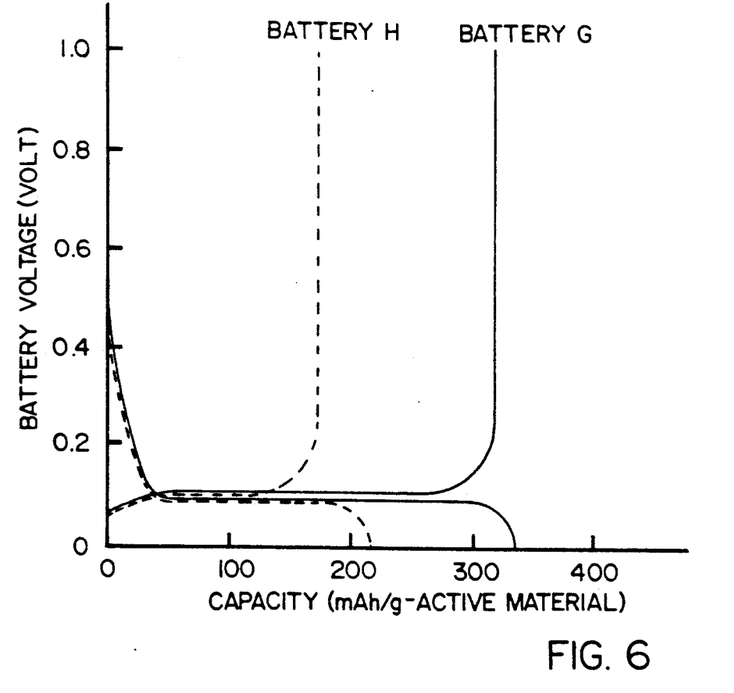
FIG. 6 shows a cathode and anode polarization curve of the $C_5N$ electrode according to the present invention.

Of the $C_5N$ electrode and C electrode, curves of the cathode polarization and anode polarization of the 10th cycle are shown in FIG. 6. The curve for $C_5N$ electrode and the curve for the C electrode are designated g and h, respectively. The voltage for the polarization is nearly the same for the $C_5N$ and C electrode, while the capacity is larger for the invented $C_5N$ electrode. It was found that the difference in discharging capacity as compared with the initial charging capacity (volume of Li which is brought by the initial charging into the carbon material and not released afterwards) decreased very much.

After the 11th cathode polarization, the batteries were disassembled. For both the batteries with $C_5N$ and C electrodes, no deposition of metal Li was recognized. For the $C_5N$ electrode, Li was occluded in the electrode by the cathode polarization.

Thus it was found that, for the $C_5N$ electrode, Li was occluded in the electrode by the cathode polarization, the occluded Li is released by the anode polarization, and the metal Li does not deposit. Furthermore, the capacity is extremely large compared with the C electrode, while the voltage for the anode polarization is the same as that of the C electrode.

Example 5

Figure 7:
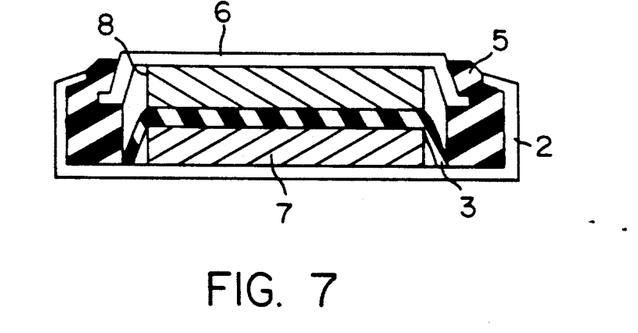
FIG. 7 is a section of a coin-type battery provided with a negative electrode of $C_5N$ according to the present invention.

A coin-type battery having a negative electrode of $C_5N$ as shown in FIG. 7 was fabricated and examined on the characteristics. It was applied with $LiMn_2O_4$ as the positive active material having reversibility for charging and discharging.

One hundred grams of the positive active material were added and mixed with 7 g of acetylene black as a conducting agent and 7 g of polytetrafluoroethylene as binder, to form a mixture for a positive electrode. A positive electrode 7 of 17.5 mm diameter formed by pressing 1 g of the mixture for the positive electrode was placed in a case 2. On the positive electrode 7, a microporous polypropylene separator 3 was placed.

A PC solution containing lithium trifluoromethanesulfonide ($LiCF_3SO_3$) dissolved therein by the ratio of 1 mol/l was made the nonaqueous electrolyte. The mixture for negative electrode was prepared by mixing 10 g of $C_5N$ with 1 g of polyethylene powder as binder.

A negative electrode 8 of 17.5 mm diameter was prepared by pressing 0.1 g of this mixture. Upon the separator 3 the nonaqueous electrolyte was poured, and further thereupon the negative electrode 8 was placed. On the negative electrode 8, a cover 6 having a polypropylene gasket 5 on the periphery was laid to seal and to finish the battery.

A conventional battery, having a negative electrode of natural graphite, and the other elements similar with those for the battery of $C_5N$ was prepared. The battery with C electrode was designated i and that with $C_5N$ j. For both batteries the capacity of the positive electrode were larger, so that the capacity of the batteries were decided by the capacities of the negative electrodes.

Figure 8:
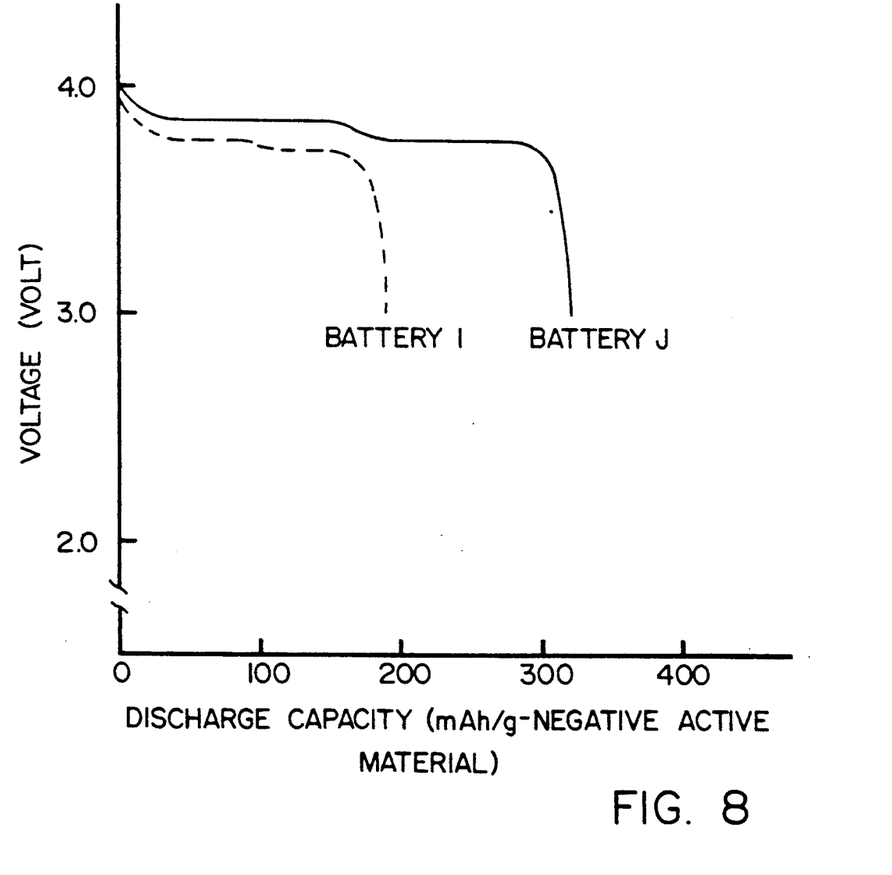
FIG. 8 shows a discharging curve of a coin-type battery having a negative electrode of $C_5N$, of which the alkaline metal involved by charging is lithium.

The batteries were charged with a constant current of 2 mA, up to 4.4 V, and then discharged down to 3 V. The charging and discharging were repeated. In FIG. 8 a discharging curve of the 10th cycle is shown. The discharge voltages are the same for both i and j, while the capacity is extremely large for j.

After the 50th charging, the batteries were disassembled to inspect on the deposition of metal Li, without being recognized.

It goes without saying that the negative electrode of $C_5N$ can realize the same result if combined with a positive active material such as $LiCoO_2$ or $LiNiO_2$, instead of $LiMn_2O_4$, which has reversibility for charging and discharging.

Example 6

In this embodiment, investigation was made on a negative electrode involving Na by charging, instead of Li of Example 4 and 5. It was applied with $NaNiO_2$ for the active material of positive electrode, and γ-butyrolactone containing sodium perchlorate($NaClO_4$) solved therein by the ratio of 1 mol/l for the nonaqueous electrolyte, and other constituents or condition are the same as those of Example 5.

The battery having a C negative electrode was designated k, and that having a $C_5N$ negative electrode 1. For both the batteries the electric capacity was larger for the positive electrode, so that the capacity of the batteries was decided by those of the negative electrode.

Figure 9:
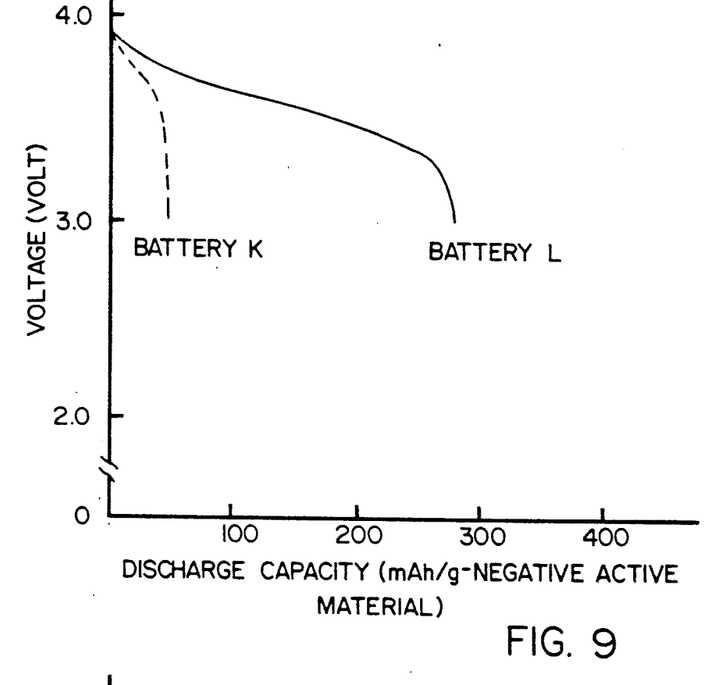
FIG. 9 shows a discharging curve of a coin-type battery having a negative electrode of $C_5N$, of which the alkaline metal involved by charging is sodium.

The batteries were charged with a constant 2 mA current, up to 4.0 V, and then discharged down to 2.5 V, and this charging and discharging was repeated. In FIG. 9 the discharging curves of the 10th cycle are shown. The discharge voltages are the same for both k and i, while the capacity is extremely large for i. After the 50th charging, the batteries here disassembled and inspected for the deposition of metal Na. This deposition was not recognized.

Example 7

A battery having a mixture of $C_5N$ and $BC_3$ as the active material for a negative electrode is explained.

A coin-type battery having a mixture of $C_5N$ and $BC_3$ as the negative electrode was fabricated and examined on the characteristics.

As the positive active material having reversibility for charging and discharging, $LiMn_2O_4$ was applied.

Figure 10:
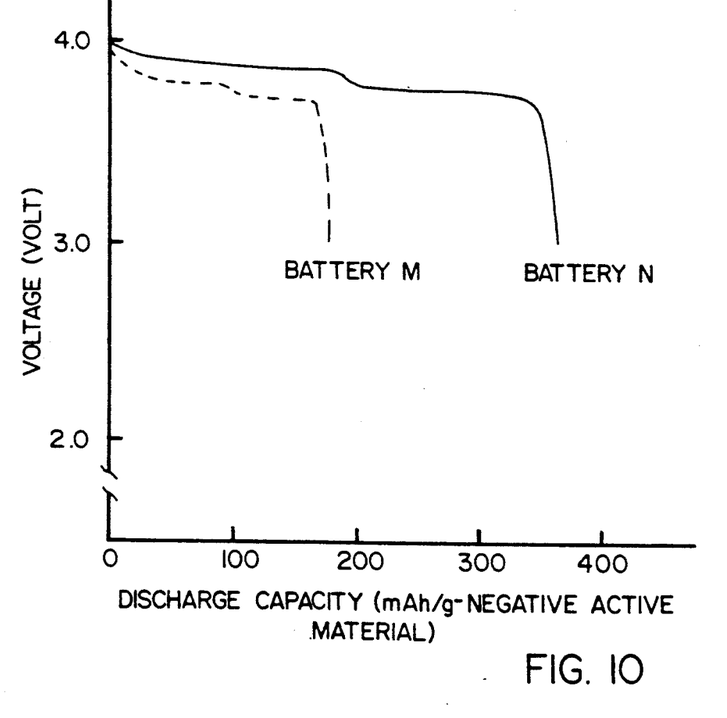
FIG. 10 shows a discharging curve of a coin-type battery having a negative electrode of mixture of $BC_3$ and $C_5N$, of which the alkaline metal involved by charging is lithium.

One hundred grams of positive active material were added and mixed with 7 g of acetylene black as a conducting agent and 7 g of polyethylenefluoride to make the mixture for the positive electrode. A positive electrode 7 of 17.5 mm diameter was formed by pressing 1 g of the mixture for the positive electrode, and was placed in a case 2. A microporous polypropylene separator 3 was put on the positive electrode. A PC solution in which lithium trifluoromethanesulfonide($LiCF_3SO_3$) was dissolved at the rate of 1 mol/l was made the nonaqueous electrolyte. The mixture for the negative electrode was prepared by adding and mixing 5 g of $BC_3$ and 5 g of $C_5N$ and polyethylene powder 1 g as the binder. The negative electrode 8 of 17.5 mm diameter was made by pressing 0.1 g of the mixture. Upon the separator 3, the nonaqueous electrolyte was poured and further upon the negative electrode 8 was placed.

On the negative electrode 8, a cover 6 with polypropylene gasket 5 on the periphery was laid to seal and finish the cell.

As the conventional battery, a similar coin-type battery was prepared with a negative electrode of natural graphite. The battery with C negative electrode was designated m, and the battery with a negative electrode of a mixture of $C_5N$ and $BC_3$ was designated n.

For both the batteries, capacities of the positive electrode were larger, and the capacity of the cells were decided by the capacities of the negative electrodes.

The batteries were charged with a constant 2 mA current, up to 4.4 V, and then discharged down to 3 V. This was done repeatedly. In FIG. 10, discharge curves of the 10th cycle are shown. The discharge voltage are the same for both m and n, while the capacity is quite large for n. After the 50th charging, the batteries were disassembled and inspected for the deposition of metal Li, without this deposition being recognized.

In the above described embodiments, the batteries were made in a coin-type configuration. However, the batteries to be applied with the electrode of the present invention are not confined to a coin-type configuration, and the same results were obtained with other types of configurations such as cylindrical, square or flat.

The nonaqueous electrolyte secondary battery with a negative electrode according to the present invention having $C_5N$ or $BC_3$ or the mixture of them, which are quite different from a uniform BCN compound constituted by B, C, and N elements, can realize a battery of large capacity of high energy density and of reasonable voltage.

What is claimed is:

1. A nonaqueous electrolyte secondary battery comprising:
   a positive electrode and a negative electrode, wherein said positive electrode and said negative electrode are reversible for charging and discharging, and
   a nonaqueous electrolyte containing alkaline metal ions,
   wherein the negative electrode is selected from the group consisting of borontricarbide and pentacarbonnitride which contains alkaline metal at a charged state.

2. A nonaqueous electrolyte secondary battery according to claim 1, wherein the alkaline metal is selected from the group consisting of lithium and sodium.

3. A nonaqueous electrolyte secondary battery comprising:
   a negative electrode of borontricarbide which contains lithium at a charged state,
   a positive active material of composite oxide containing lithium ions, and
   a nonaqueous electrolyte consisting of organic solvent in which a salt involving lithium ions is dissolved.

4. A nonaqueous electrolyte secondary battery comprising:
   a negative electrode of borontricarbide which contains sodium at a charged state,
   a positive active material of composite oxide containing sodium ions, and
   a nonaqueous electrolyte consisting of organic solvent in which a salt involving sodium ions is dissolved.

5. A nonaqueous electrolyte secondary battery comprising:
   a negative electrode of pentacarbonnitride which contains lithium at a charged state.
   a positive active material of composite oxide containing lithium ions, and
   a nonaqueous electrolyte consisting of organic solvent in which a salt involving lithium ions is dissolved.

6. A nonaqueous electrolyte secondary battery comprising:
   a negative electrode of pentacarbonnitride which contains sodium at a charged state,
   a positive active material of composite oxide containing sodium ions, and
   a nonaqueous electrolyte consisting of organic solvent in which a salt involving sodium ions is dissolved.

7. A nonaqueous electrolyte secondary battery comprising:

a negative electrode of a mixture of borontricarbide and pentacarbonnitride which contains lithium at a charged state, a positive active material of composite oxide containing lithium ions, and a nonaqueous electrolyte consisting of organic, solvent in which a salt involving lithium ions is dissolved.

* * * * *

UNITED STATES PATENT AND TRADEMARK OFFICE
CERTIFICATE OF CORRECTION

PATENT NO. :    5,229,226
DATED      :    July 20, 1993
INVENTOR(S) :   Bito et al.

It is certified that error appears in the above-indentified patent and that said Letters Patent is hereby corrected as shown below:

Title Page, Item 75, Inventors, add --Yoshinori Toyoguchi--.

Signed and Sealed this

Thirty-first Day of May, 1994

Attest:

BRUCE LEHMAN

*Attesting Officer*     *Commissioner of Patents and Trademarks*